United States Patent [19]
Oprea

[11] Patent Number: 6,039,448
[45] Date of Patent: Mar. 21, 2000

[54] SIDE REARVIEW MIRROR DEVICE

[76] Inventor: Florin I. Oprea, 12239 Covello St., North Hollywood, Calif. 91605

[21] Appl. No.: 09/164,648

[22] Filed: Oct. 1, 1998

[51] Int. Cl.[7] ................................................. G02B 5/08
[52] U.S. Cl. ...................... 359/850; 359/851; 359/853; 362/135; 362/140; 362/144
[58] Field of Search .................................. 359/850, 851, 359/853, 858, 859, 862, 865, 866; 116/202; 362/135, 140, 144; 340/468, 469, 470, 478

[56] References Cited

U.S. PATENT DOCUMENTS

| | | | |
|---|---|---|---|
| 4,891,625 | 1/1990 | VanRiper et al. | 340/479 |
| 5,272,416 | 12/1993 | Deems | 315/82 |
| 5,634,234 | 6/1997 | Allain | 15/250.003 |
| 5,892,438 | 4/1999 | Vaughn | 340/468 |

*Primary Examiner*—Cassandra Spyrou
*Assistant Examiner*—Mohammad Y. Sikder

[57] ABSTRACT

A new side rear view mirror device for providing lighting thereon for aiding the visibility of the driver and others. The inventive device includes a housing with a cover lens covering a front opening in the housing. The cover lens has an upper lens and a lower lens. The upper lens of the cover lens is generally transparent while the lower lens of the cover lens has a translucent colored front region and a generally transparent bottom region. A reflector member is provided in the interior of the housing and has upper and lower reflector portions. Upper and lower light sources are also provided in the interior of the housing. The upper light source is mounted to the upper reflector portion while the lower light source is mounted to the lower reflector portion.

20 Claims, 2 Drawing Sheets

SIDE REARVIEW MIRROR DEVICE

BACKGROUND OF THE INVENTION

1. Field of the Invention

The present invention relates to side rear view mirrors and more particularly pertains to a new side rear view mirror device for providing lighting thereon for aiding the visibility of the driver and others.

2. Description of the Prior Art

The use of side rear view mirrors is known in the prior art. More specifically, side rear view mirrors heretofore devised and utilized are known to consist basically of familiar, expected and obvious structural configurations, notwithstanding the myriad of designs encompassed by the crowded prior art which have been developed for the fulfillment of countless objectives and requirements.

Known prior art side rear view mirrors include U.S. Pat. No. 4,374,348; PCT Patent No. WO 97/15471 (Inventors: O'Farrell et al.); U.S. Pat. No. 5,179,758; U.S. Pat. No. 1,940,605; U.S. Pat. No. 5,379,198; U.S. Pat. No. 3,078,494; and EPO Patent No. EP 0 536 453 A1 (Inventor: Han).

While these devices fulfill their respective, particular objectives and requirements, the aforementioned patents do not disclose a new side rear view mirror device. The inventive device includes a housing with a cover lens covering a front opening in the housing. The cover lens has an upper lens and a lower lens. The upper lens of the cover lens is generally transparent while the lower lens of the cover lens has a translucent colored front region and a generally transparent bottom region. A reflector member is provided in the interior of the housing, the reflector member has upper and lower reflector portions. Upper and lower light sources are also provided in the interior of the housing. The upper light source is mounted to the upper reflector portion while the lower light source is mounted to the lower reflector portion.

In these respects, the side rear view mirror device according to the present invention substantially departs from the conventional concepts and designs of the prior art, and in so doing provides an apparatus primarily developed for the purpose of providing lighting thereon for aiding the visibility of the driver and others.

SUMMARY OF THE INVENTION

In view of the foregoing disadvantages inherent in the known types of side rear view mirrors now present in the prior art, the present invention provides a new side rear view mirror device construction wherein the same can be utilized for providing lighting thereon for aiding the visibility of the driver and others.

The general purpose of the present invention, which will be described subsequently in greater detail, is to provide a new side rear view mirror device apparatus and method which has many of the advantages of the side rear view mirrors mentioned heretofore and many novel features that result in a new side rear view mirror device which is not anticipated, rendered obvious, suggested, or even implied by any of the prior art side rear view mirrors, either alone or in any combination thereof.

To attain this, the present invention generally comprises a housing with a cover lens covering a front opening in the housing. The cover lens has an upper lens and a lower lens. The upper lens of the cover lens is generally transparent while the lower lens of the cover lens has a translucent colored front region and a generally transparent bottom region. A reflector member is provided in the interior of the housing, the reflector member has upper and lower reflector portions. Upper and lower light sources are also provided in the interior of the housing. The upper light source is mounted to the upper reflector portion while the lower light source is mounted to the lower reflector portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new side rear view mirror device apparatus and method which has many of the advantages of the side rear view mirrors mentioned heretofore and many novel features that result in a new side rear view mirror device which is not anticipated, rendered obvious, suggested, or even implied by any of the prior art side rear view mirrors, either alone or in any combination thereof.

It is another object of the present invention to provide a new side rear view mirror device which may be easily and efficiently manufactured and marketed.

It is a further object of the present invention to provide a new side rear view mirror device which is of a durable and reliable construction.

An even further object of the present invention is to provide a new side rear view mirror device which is susceptible of a low cost of manufacture with regard to both materials and labor, and which accordingly is then susceptible of low prices of sale to the consuming public, thereby making such side rear view mirror device economically available to the buying public.

Still yet another object of the present invention is to provide a new side rear view mirror device which provides in the apparatuses and methods of the prior art some of the advantages thereof, while simultaneously overcoming some of the disadvantages normally associated therewith.

Still another object of the present invention is to provide a new side rear view mirror device for providing lighting thereon for aiding the visibility of the driver and others.

Yet another object of the present invention is to provide a new side rear view mirror device which includes a housing with a cover lens covering a front opening in the housing. The cover lens has an upper lens and a lower lens. The upper lens of the cover lens is generally transparent while the lower lens of the cover lens has a translucent colored front region and a generally transparent bottom region. A reflector member is provided in the interior of the housing, the reflector member has upper and lower reflector portions. Upper and lower light sources are also provided in the interior of the housing. The upper light source is mounted to the upper reflector portion while the lower light source is mounted to the lower reflector portion.

Still yet another object of the present invention is to provide a new side rear view mirror device that includes day time running lights to help de-mark the sides of the vehicle for others viewing the vehicle.

Even still another object of the present invention is to provide a new side rear view mirror device that a high beam light for aiding the visibility of the driver of the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
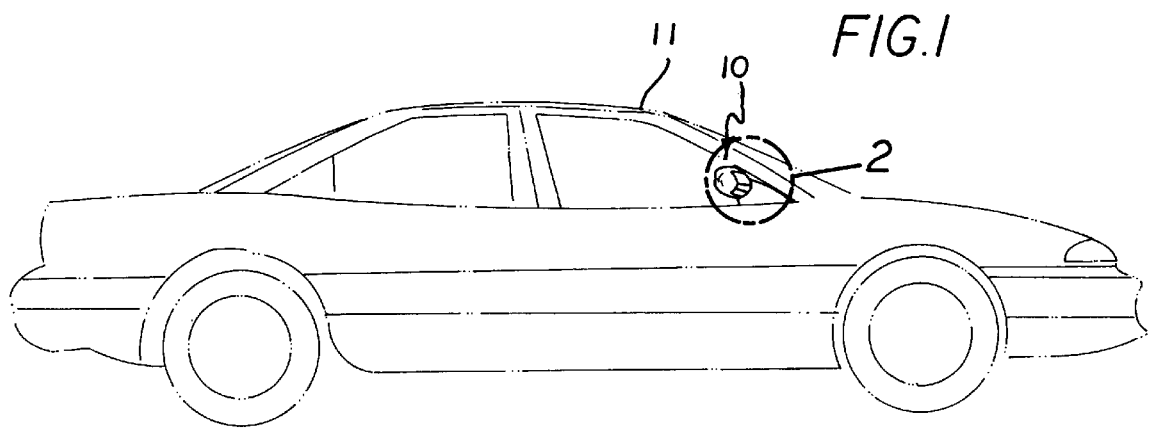
FIG. 1 is a schematic side view of a new side rear view mirror device on a vehicle according to the present invention.
Figure 2:
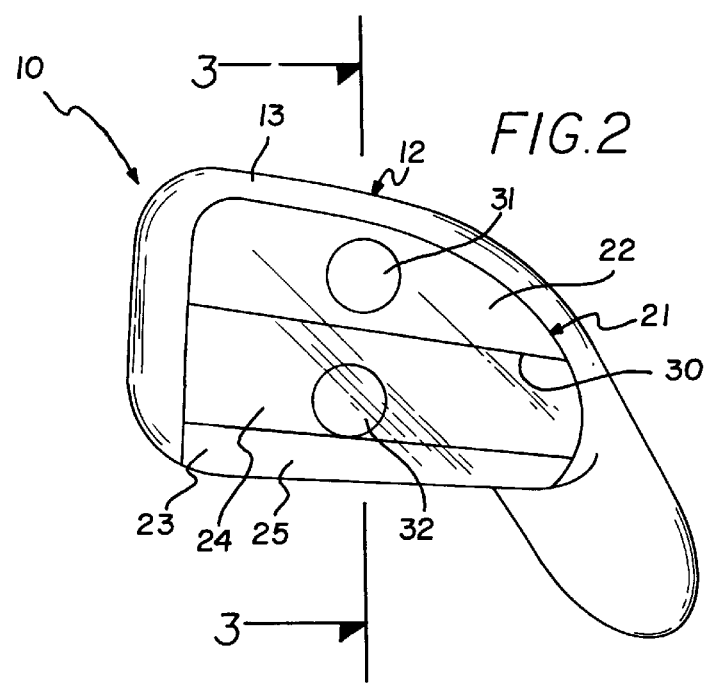
FIG. 2 is a schematic front view of the present invention as taken from the circle 2 on FIG. 1.
Figure 3:
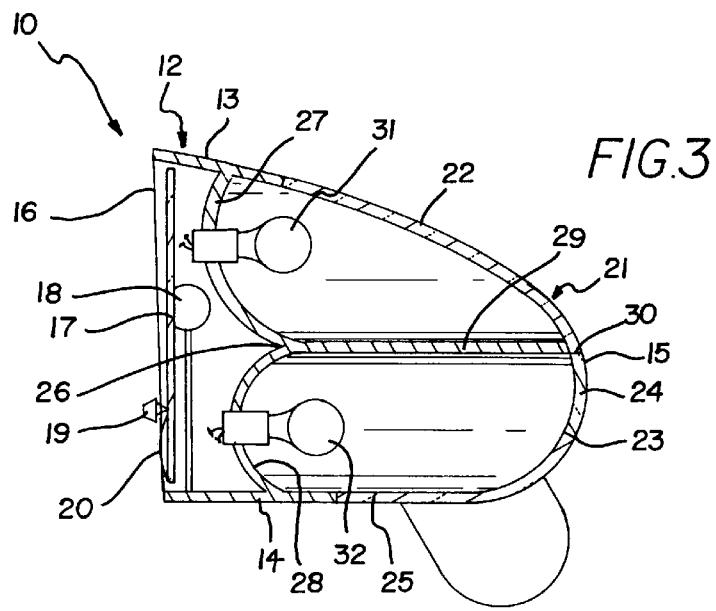
FIG. 3 is a schematic cross-sectional view of the present invention taken from line 3—3 of FIG. 2.
Figure 4:
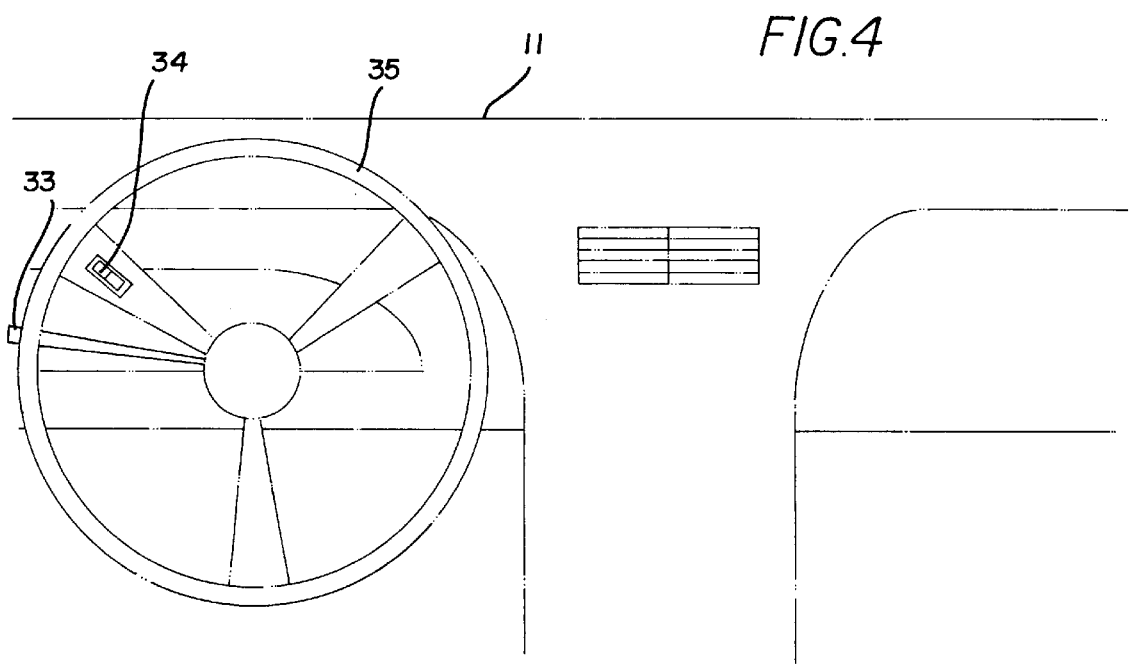
FIG. 4 is a schematic view illustrating the location of the switches of the present invention in the passenger compartment of the vehicle.

With reference now to the drawings, and in particular to FIGS. 1 through 4 thereof, a new side rear view mirror device embodying the principles and concepts of the present invention and generally designated by the reference numeral 10 will be described.

As best illustrated in FIGS. 1 through 4, the side rear view mirror device 10 generally comprises a housing 12 with a cover lens 21 covering a front opening in the housing 12. The cover lens 21 has an upper lens 22 and a lower lens 23. The upper lens 22 of the cover lens 21 is generally transparent while the lower lens 23 of the cover lens 21 has a translucent colored front region 24 and a generally transparent bottom region 25. A reflector member 26 is provided in the interior of the housing 12. The reflector member 26 has upper and lower reflector portions 27,28. Upper and lower light sources 31,32 are also provided in the interior of the housing 12. The upper light source 31 is mounted to the upper reflector portion 27 while the lower light source 32 is mounted to the lower reflector portion 28.

In use, the side rear view mirror device 10 is designed for mounting to the side of a vehicle 11. In closer detail, the housing 12 is mountable to the side of a vehicle 11 and has an interior, a top 13, a bottom 14, a generally curved front 15 and a generally flat rear 16. A mirror 17 is pivotally mounted 18 to the rear 16 of the housing 12. Preferably, the housing 12 has a mirror wiper assembly 19 with a wiper blade for moving across the mirror 17 to remove fluid and debris from the mirror 17. Even more preferably, the mirror 17 has a convex portion 20 for permitting viewing of a wide area behind the side of the vehicle 11. The convex portion 20 is preferably positioned towards the bottom 14 of the housing 12 preferably distal the side of the housing 12 mounted to the vehicle 11.

The housing 12 has a frontal opening into the interior of the housing 12. The front opening extends towards the top 13 of the rear 16 of the housing 12 and the bottom 14 of the rear 16 of the housing 12. A cover lens 21 covers the front opening while still permitting passage of light therethrough. The cover lens 21 preferably has an upper lens 22 and a lower lens 23 and a dividing line 30 extending between the upper and lower lenses of the cover lens 21. The upper lens 22 of the cover lens 21 extends from the front 15 of the housing 12 towards the top 13 of the rear 16 of the housing 12 while the lower lens 23 of the cover lens 21 extends from the front 15 of the housing 12 towards the bottom 14 of the rear 16 of the housing 12. The upper lens 22 of the cover lens 21 is generally transparent.

The lower lens 23 of the cover lens 21 has a front region 24 and a bottom region 25. The front region 24 of the lower lens 23 of the cover lens 21 is located towards the front 15 of the housing 12 while the bottom region 25 of the lower lens 23 of the cover lens 21 is located towards the bottom 14 of the housing 12. The front region 24 of the lower lens 23 of the cover lens 21 comprises a colored generally translucent material that ideally, is colored amber. The bottom region 25 of the lower lens 23 of the cover lens 21 is generally transparent.

A reflector member 26 is provided in the interior of the housing 12. The reflector member 26 has upper and lower reflector portions 27,28 and a divider portion 29 between the upper and lower reflector portions 27,28. The upper and lower reflector portions 27,28 are positioned between the front 15 and rear 16 of the housing 12. The divider portion 29 extends from the reflector portions towards dividing line 30 of the cover lens 21 to divide the interior of the housing 12 into upper and lower front 15 compartments. Each reflector portion 27,28 has a concavity facing towards the front 15 of the housing 12. Ideally, the concavities have an outer reflective surface to reflect light towards the front 15 of the housing 12.

Upper and lower light sources 31,32 are provided in the interior of the housing 12. The light sources 31,32 are preferably electrically connected to a power source of the vehicle 11. The upper light source 31 is mounted to the upper reflector portion 27 between the concavity of the upper reflective portion and the front 15 of the housing 12. Similarly, the lower light source 32 is mounted to the lower reflector portion 28 between the concavity of the lower reflective portion and the front 15 of the housing 12. A first switch 33 is electrically connected to the upper light source 31 to permit selective activation of the upper light source 31. Preferably, the first switch 33 is electrically connected to the high beam switch of the headlights of the vehicle 11. A second switch 34 is electrically connected to the lower light source 32 to permit selective activation of the lower light source 32. The second switch 34 is preferably provided in the passenger compartment of a vehicle 11 and mounted, for example, to the steering wheel 35 of the vehicle 11.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A side rear view mirror device for mounting to a side of a vehicle, said device comprising:

a housing having an interior, a top, a bottom, a front and a rear, said housing being mountable to the side of a vehicle;

a mirror being mounted to said rear of said housing;

said housing having a frontal opening into said interior of said housing, said frontal opening extending towards said top of said rear of said housing and said bottom of said rear of said housing;

said housing having a cover lens covering said front opening, said cover lens permitting passage of light therethrough;

said cover lens having an upper lens section and a lower lens section and a dividing line extending between said upper and lower lenses of said cover lens;

said upper lens section of said cover lens extending from said front of said housing towards said top of said rear of said housing, said lower lens section of said cover lens extending from said front of said housing towards said bottom of said rear of said housing;

said upper lens section of said cover lens being generally transparent;

said lower lens section of said cover lens having a front region and a bottom region;

said front region of said lower lens section of said cover lens comprising a colored generally translucent material;

said bottom region of said lower lens section of said cover lens being generally transparent;

a reflector member being provided in said interior of said housing, said reflector member having upper and lower reflector portions; and upper and lower light sources being provided in said interior of said housing, said upper light source being mounted to said upper reflector portion, said lower light source being mounted to said lower reflector portion.

2. The device of claim 1, wherein said mirror is pivotally mounted to said rear of said housing.

3. The device of claim 1, wherein said housing has a mirror wiper assembly having a wiper blade for moving across said mirror to remove fluid and debris from said mirror.

4. The device of claim 1, wherein said mirror has a convex portion, said convex portion of said mirror being positioned towards said bottom of said housing.

5. The device of claim 1, wherein t he color of said front region of said lower lens is amber.

6. The device of claim 1, wherein said reflector member has a divider portion between said upper and lower reflector portions, said divider portion extending from said reflector portions towards said dividing line of said cover lens.

7. The device of claim 1, wherein each reflector portion of said reflector member has a concavity facing towards said front of said housing.

8. The device of claim 1, wherein a first switch is electrically connected to said upper light source, said first switch permitting selective activation of said upper light source, said first switch being electrically connected to a high beam switch of the headlights of the vehicle.

9. The device of claim 1, wherein a second switch is electrically connected to said lower light source, said second switch permitting selective activation of said lower light source. said second switch being provided in a passenger compartment of a vehicle.

10. A side rear view mirror device for mounting to a side of a vehicle, said device comprising:

a housing having an interior, a top, a bottom, a front and a rear, said housing being mountable to the side of a vehicle;

a mirror being pivotally mounted to said rear of said housing;

said housing having a mirror wiper assembly having a wiper blade for moving across said mirror to remove fluid and debris from said mirror;

said mirror having a convex portion, said convex portion of said mirror being positioned towards said bottom of said housing;

said housing having a frontal opening into said interior of said housing, said frontal opening extending towards said top of said rear of said housing and said bottom of said rear of said housing;

said housing having a cover lens covering said front opening, said cover lens permitting passage of light therethrough;

said cover lens having an upper lens section and a lower lens section and a dividing line extending between said upper and lower lenses of said cover lens;

said upper lens of said cover lens extending from said front of said housing towards said top of said rear of said housing, said lower lens of said cover lens extending from said front of said housing towards said bottom of said rear of said housing;

said upper lens section of said cover lens being generally transparent;

said lower lens section of said cover lens having a front region and a bottom region, said front region of said lower lens section of said cover lens being located towards said front of said housing, said bottom region of said lower lens section of said cover lens being located towards said bottom of said housing;

said front region of said lower lens section of said cover lens comprising a colored generally translucent material, wherein said color of said front region is amber;

said bottom region of said lower lens section of said cover lens being generally transparent;

a reflector member being provided in said interior of said housing, said reflector member having tipper and lower reflector portions and a divider portion between said upper and lower reflector portions, said upper and lower reflector portions being positioned between said front and rear of said housing, said divider portion extending from said reflector portions towards said dividing line of said cover lens, each reflector portion having a concavity facing towards said front of said housing;

upper and lower light sources being provided in said interior of said housing, said light sources being electrically connect to a power source of the vehicle, said tipper light source being mounted to said upper reflector portion, said lower light source being mounted to said lower reflector portion;

a first switch being electrically connected to said upper light source, said first switch permitting selective activation of said upper light source, said first switch being electrically connected to a high beam switch of the headlights of the vehicle; and a second switch being electrically connected to said lower light source, said second switch permitting selective activation of said lower light source, said second switch being provided in a passenger compartment of a vehicle.

11. A side rear view mirror device for mounting to a side of a vehicle, said device comprising:

a housing having an interior, a top, a bottom, a front and a rear, said housing being mountable to the side of a vehicle;

a mirror being mounted to said rear of said housing;

said housing having a frontal opening into said interior of said housing, said frontal opening extending towards said top of said rear of said housing and said bottom of said rear of said housing;

said housing having a cover lens covering said front opening, said cover lens permitting passage of light therethrough;

said cover lens having an upper lens section and a lower lens section and a dividing line extending between said upper and lower lenses of said cover lens;

said upper lens section of said cover lens extending from said front of said housing towards said top of said rear of said housing, said lower lens section of said cover lens extending from said front of said housing towards said bottom of said rear of said housing;

said lower lens section of said cover lens having a front region and a bottom region;

a reflector member being provided in said interior of said housing. said reflector member having upper and lower reflector portions; and upper and lower light sources being provided in said interior of said housing, said upper light source being mounted to said upper reflector portion, said lower light source being mounted to said lower reflector portion.

12. The device of claim 11, wherein said mirror is pivotally mounted to said rear of said housing.

13. The device of claim 11, wherein said housing has a mirror wiper assembly having a wiper blade for moving across said mirror to remove fluid and debris from said mirror.

14. The device of claim 11, wherein said mirror has a convex portion, said convex portion of said mirror being positioned towards said bottom of said housing.

15. The device of claim 11, wherein the color of said front region of said lower lens section is amber.

16. The device of claim 11, wherein said reflector member has a divider portion between said upper and lower reflector portions, said divider portion extending from said reflector portions towards said dividing line of said cover lens.

17. The device of claim 11, wherein each reflector portion of said reflector member has a concavity facing towards said front of said housing.

18. The device of claim 11, wherein a first switch is electrically connected to said upper light source, said first switch permitting selective activation of said upper light source, said first switch being electrically connected to a high beam switch of the headlights of the vehicle.

19. The device of claim 11, wherein a second switch is electrically connected to said lower light source, said second switch permitting selective activation of said lower light source, said second switch being provided in a passenger compartment of a vehicle.

20. The device of claim 11, wherein said front region of said lower lens section of said cover lens comprises a generally translucent material, and wherein said bottom region of said lower lens section of said cover lens is generally transparent.

* * * * *